Nov. 28, 1961   B. BARÉNYI   3,010,756
FRAME STRUCTURE FOR MOTOR VEHICLES
Filed Oct. 29, 1957
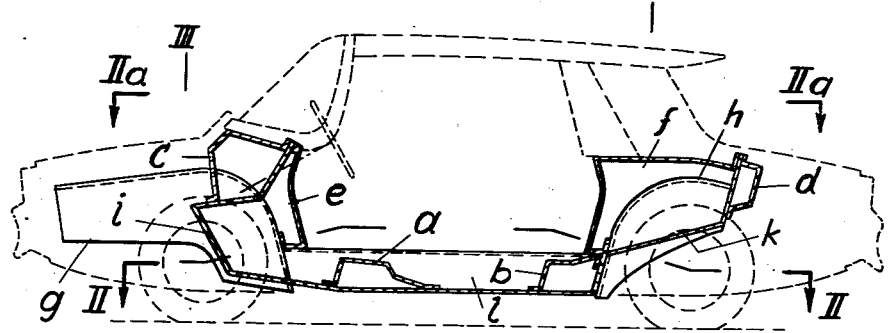
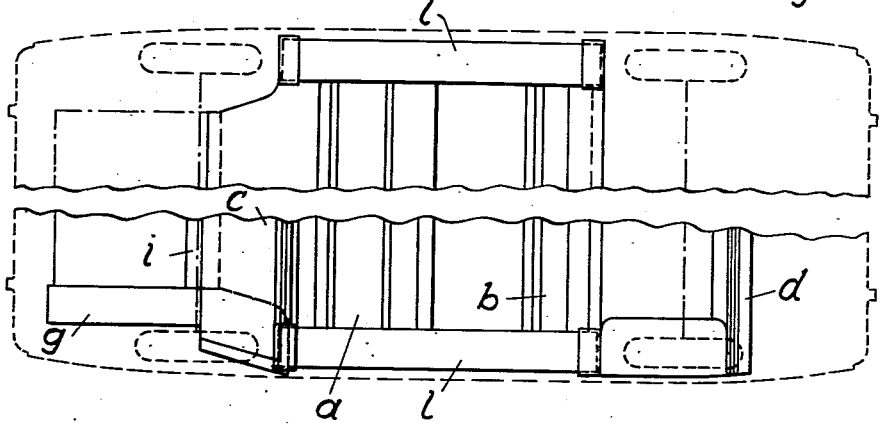
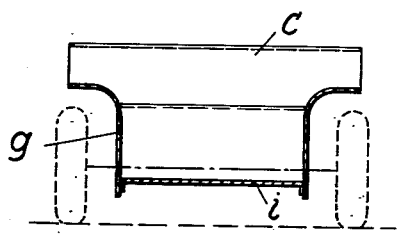
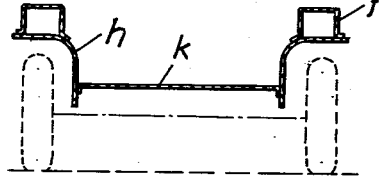
INVENTOR
BÉLA BARÉNYI
BY   Dicke and Craig
ATTORNEYS

United States Patent Office 3,010,756
Patented Nov. 28, 1961

3,010,756
FRAME STRUCTURE FOR MOTOR VEHICLES
Béla Barényi, Stuttgart-Vaihingen, Germany, assignor to Daimler-Benz Aktiengesellschaft, Stuttgart-Unterturkheim, Germany
Filed Oct. 29, 1957, Ser. No. 693,118
Claims priority, application Germany Nov. 2, 1956
14 Claims. (Cl. 296—28)

The present invention relates to improvements in supporting frames for the bodies of passenger cars, consisting of side members and cross members.

It is an object of the present invention to provide a supporitng body frame of the above-mentioned type in which the cross members are made of a special design and are connected to the car body by means of specially designed parts of the car body whereby the stresses and jolts which are exerted by the wheels upon the car will be substantially taken up by the cross members so that the other parts of the car body will thus be protected from excessive strains.

The present invention consists in providing the frame of the car with four main cross members which are adapted to take up the main stresses which result from the jolts coming from the wheels, and in connecting each pair of these cross members to each other by means of parts including uprights, wheel housing members forming part of the enclosures, floor boards, and longitudinally extending frame members. These cross members may preferably be made in the form of hollow box-shaped beams which are specially designed and arranged, and connected to the other mentioned parts of the car body so that no more than four of these cross members will be required to take up the stresses, to distribute them uniformly, and substantially to prevent them from passing to the remainder of the car body. Furthermore, the individual parts of the new frame structure consisting of the mentioned cross members and connecting members which take up the main stresses which might act upon the car body may be very easily manufactured and assembled to form a supporting unit. For this purpose, two of the main cross members may be disposed below the seats of the car and substantially within the horizontal plane passing through the wheel axles and between the wheels while each of the two other main cross members may be disposed in a region above the vehicle wheels at a level above the wheel axles and between each pair of wheels. The longitudinal or side members of the bottom frame are preferably mounted in the conventional manner so as to extend along their lengths in the longitudinal spaces above the tracks of the vehicle wheels at opposite sides of the vehicle and along the lower side edges of the car body so that the latter will have sufficient ground clearance and be of sufficient width to accommodate the passengers. These side members of the bottom frame connect the two lower main cross members to each other, while the uprights, the wheel housing or casing members, and the floor boards also connect the respective main front and rear cross members which are disposed above the wheels to the lower cross members by means of the side members. The uprights which extend generally in the vertical space above the tracks of the vehicle wheels and along the outer side walls of the car body may also serve as door posts and be designed so that the surfaces of opposite uprights which face toward each other are symmetrical with respect to a vertical transverse plane. The uprights and cross members may also serve either individually or together for mounting other elements of the car body thereon.

Further objects, features, and advantages of the present invention will be apparent from the following detailed description thereof, particularly when read with reference to the accompanying diagrammatic drawings, in which—

FIG. 1 illustrates a longitudinal cross section of a car according to the present invention;
FIG. 2 illustrates the car according to FIG. 1 in two horizontal cross sections, the upper half being taken along line II—II of FIG. 1, and the lower half being taken along line IIa—IIa of FIG. 1;
FIG. 3 illustrates a cross section taken along line III—III of FIG. 1; while
FIG. 4 illustrates a cross section taken along line IV—IV of FIG. 1.

Referring to the drawings, the main cross members $a$ and $b$ of the frame are mounted within the bottom part of the car within a plane which extends substantially at the level of the two wheel axles. The two other main cross members $c$ and $d$ are disposed at a level above the wheels and each of them in a region above the wheels at the respective vehicle ends and within a vertical plane which extends slightly toward the rear of a plane passing through the wheel axles of a respective pair of oppositely-disposed wheels. Cross member $c$ is mounted underneath the windshield of the car, while cross member $d$ is mounted at a point approximately underneath the rear window. All of the cross members $a$ to $d$ are made in the form of hollow box-shaped elements. The lower cross beams $a$ and $b$ are laterally connected to each other by means of the side members $i$ which are provided at the lower side of the lateral covering of the car body and preferably near the outer edges thereof in the space generally above the tracks of the vehicle wheels. The side members 1 of the frame are connected at the front part of the car body to the floorboard $i$, the uprights $e$, and the wheel housing or casing members $g$, and these parts alone connect the cross members $a$ and $c$ to each other to form a supporting unit. This is similarly applicable to the connection between the main cross members $b$ and $d$ at the rear part of the car body which together also form a supporting unit. Cross members $b$ and $d$ are connected to each other by means of the wheel housing or casing members $h$, the floorboard $k$, and the uprights $f$. The entire supporting structure of the car body according to the invention therefore lies substantially within the area which is limited by the wheels and within the space between each wheel axle and the respective wheels. The uprights $e$ and $f$ are located generally in the vertical space above the tracks of the vehicle wheels. The surfaces of uprights $e$ and $f$ which face toward each other are symmetrical with respect to a vertical plane between the wheels and extending transversely of the direction of vehicle travel. They can therefore be easily used at both sides for the insertion of the doors. The uprights $e$ and $f$ are joined to the wheel housing members $g$ and $h$, respectively to define upright structures at opposite ends of the longitudinally extending side members $l$. Thus, these upright structures and the longitudinal side member $l$ at each side of the car body define supporting structures located generally in the longitudinal vertical spaces above the wheel tracks of the vehicle, the side structures being interconnected by the transversely extending cross members $a$, $b$, $c$ and $d$ together with the floor board $k$. It will be seen, by referring to FIGURES 1 and 4 that the upright structures including uprights $f$ and portions of the wheel, for example, extend from the rear end of the longitudinal side members $l$ upwardly and rearwardly toward the end of the vehicle over the rear wheels.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A body structure for a four-wheel motor vehicle comprising four main cross beam members forming two pairs disposed at the forward and rear parts of said vehicle, respectively, each pair of cross beam members including an upper cross member and a lower cross member, one cross member of each pair being located in a region above the vehicle wheels at the corresponding end part of the vehicle, and upon said vehicle, and connecting parts including longitudinal frame members, uprights at opposite ends of each frame member, wheel housing members, and floor boards connecting the two cross members of each said pair of said cross members to each other in such a manner that the main stresses between the vehicle body and the vehicle wheels are taken by said cross members and said parts, said longitudinal frame members and said uprights being disposed generally in the vertical space above the tracks of the respective wheels at opposite sides of the vehicle.

2. A body structure for a motor vehicle as defined in claim 1, wherein the two lower main cross members, including one from each said pair, are disposed underneath the seat portions of said vehicle substantially within a horizontal plane extending through the wheel axles and between said axles, each of the upper main cross members being disposed above a respective pair of oppositely-disposed wheels.

3. A body structure for a motor vehicle as defined in claim 1, wherein each of said cross members has a hollow, box-shaped form.

4. A body for a motor vehicle as defined in claim 2, wherein said longitudinal frame members are disposed along the lower lateral edges of the vehicle body, said uprights, wheel housing members, and floorboards connecting said rear cross members and said front cross members, respectively, to each other by means of said longitudinal frame members, said longitudinal frame members also connecting the lower cross members to each other.

5. A body structure for a motor vehicle as defined in claim 1, wherein the surfaces of said uprights facing toward each other are symmetrical with respect to a vertical plane within said vehicle transversely of the direction of vehicle travel.

6. A body structure for a motor vehicle as defined in claim 1, wherein said uprights form at least a part of the door posts of said vehicle.

7. A body structure for a motor vehicle as defined in claim 1, wherein said uprights form elements for mounting other parts of the vehicles body thereon.

8. A body structure for a motor vehicle as defined in claim 1, wherein said uprights together with at least one of said cross members form elements for mounting other parts of the vehicle body thereon.

9. A body structure for a four-wheel motor vehicle comprising four main cross beam members forming two pairs disposed at forward and rear parts of said vehicle, respectively, one cross beam member of each pair being located in a region above the wheels at a respective end part of the vehicle, and connecting parts interconnecting at least the ends of said cross beam members to each other at each side of the vehicle, said connecting parts including longitudinal frame members, uprights at opposite ends of each frame member, wheel casing members, and floor boards, said longitudinal frame members being disposed along their lengths in the longitudinal space above the tracks of the respective pairs of wheels at opposite sides of the vehicle, said uprights being arranged generally at the outer side walls of the vehicle body, said cross beam members and said parts being interconnected in such a manner that the stresses between the vehicle body and the vehicle wheels are substantially taken by said cross members and said parts.

10. A body structure according to claim 9 wherein said cross beam members and said parts constitute a main supporting structure for the vehicle body lying substantially within a vertical area defined by the four vehicle wheels.

11. A body structure according to claim 9 wherein said uprights at one part of the vehicle constitute extensions of said longitudinal frame members for interconnecting the pair of cross beam members at said one part of the vehicle.

12. A body structure for a four-wheel motor vehicle comprising four main cross beam members forming two pairs disposed at forward and rearward parts of said vehicle, respectively, and connecting parts interconnecting at least the ends of said cross beam members to each other at each side of the vehicle, said connecting parts including longitudinal frame members along opposite sides of the body structure, upright structures at the ends of said frame members, and floor boards, said longitudinal frame members being disposed in a generally horizontal plane at the lower sides of the vehicle body, said upright structures being joined to said longitudinal frame members and being located in the respective longitudinal vertical planes of said frame members, at least one of the upright structures at each side of the vehicle extending from the respective frame member upwardly and toward the end of the vehicle over the respective vehicle wheel to define with the longitudinal frame member a structure interconnecting the ends of one pair of cross members at the respective side of the vehicle body.

13. A body structure according to claim 12, wherein at least some of said upright structures are defined by uprights and wheel casing members joined together and each extending between an end of a respective longitudinal frame member and the end of one of said cross beam members.

14. A body structure according to claim 13, wherein one of the cross beam members of each pair is disposed in a region above the vehicle wheels at a respective end part of the vehicle.

References Cited in the file of this patent

UNITED STATES PATENTS

| | | |
|---|---|---|
| 2,240,022 | Saires | Apr. 29, 1941 |
| 2,637,592 | Karlby | May 5, 1953 |
| 2,851,302 | Owen | Sept. 9, 1958 |
| 2,933,341 | Muller | Apr. 19, 1960 |

FOREIGN PATENTS

| | | |
|---|---|---|
| 870,108 | France | Dec. 5, 1941 |
| 728,111 | Germany | Nov. 20, 1942 |
| 765,057 | Germany | July 5, 1954 |
| 834,648 | Germany | Mar. 20, 1952 |
| 867,059 | Germany | Feb. 16, 1953 |
| 477,482 | Great Britain | Dec. 31, 1937 |